United States Patent [19]

Shore et al.

[11] Patent Number: 5,169,613
[45] Date of Patent: Dec. 8, 1992

[54] METHOD FOR THE PREPARATION OF BORON NITRIDE USING AMMONIA-MONOHALOBORANE

[75] Inventors: Sheldon G. Shore, Columbus, Ohio; Philipp M. Niedenzu, Newark, Del.; Allison L. DeGraffenreid, Cincinnati, Ohio

[73] Assignee: The Ohio State University Research Foundation, Columbus, Ohio

[21] Appl. No.: 651,311

[22] Filed: Feb. 6, 1991

[51] Int. Cl.$^5$ ............................................. C01B 35/02
[52] U.S. Cl. .................. 423/289; 423/284; 423/286; 423/287; 423/290; 423/406
[58] Field of Search ............ 423/284, 286, 287, 289, 423/290, 406

[56] References Cited

U.S. PATENT DOCUMENTS 3,241,919  3/1966  O'Conner.
4,157,927  6/1979  Chew et al. ........................ 149/22
4,707,556 11/1987  Paciarek et al. .................... 556/403
5,053,365 10/1991  Shore et al. ........................ 501/96

FOREIGN PATENT DOCUMENTS 0396448 11/1990 European Pat. Off. ............ 423/406

OTHER PUBLICATIONS

Wang and Geanangel, *Inorg. Chim. Acta.*, 148, 1988, pp. 185–190.
Jeffrey S. Beck et al., *Chem. Mat.*, 1, 1989, pp. 433–438.
M. G. Hu et al., *Thermochim. Acta.*, 23, 1978, pp. 249–255.
*Advanced Inorganic Chemistry* by Cotton & Wilkinson, 2nd ed., pub. by Interscience Publishers, New York, 1966, see p. 275.
Gmelin Handbuch der Anorganischen Chemie, 3rd Supplement, vol. 3, 1988.
Narula et al., *Chem. Rev.*, 90, 1990, pp. 73–91.
Komm et al., *Inorg. Chem.*, 22, 1983, pp. 1684–1686.
Walker et al., *Ceram. Bull.*, 62, 1983, pp. 916–923.
Sneddon, *Chem. Mat.*, 1, 1989, pp. 433–438.

Primary Examiner—Gary P. Straub
Assistant Examiner—timothy C. Vanoy
Attorney, Agent, or Firm—Frank H. Foster

[57] ABSTRACT

The invention relates to the synthesis of ammonia-haloboranes, and in particular, $H_3NBH_2Cl$, which materials are useful for the produciton of amorphous boron nitride and crystalline turbostratic boron nitride by heating.

4 Claims, No Drawings

METHOD FOR THE PREPARATION OF BORON NITRIDE USING AMMONIA-MONOHALOBORANE

This invention was made with government support under Grant No. DAAL03-88-K-0176 awarded by the U.S. Army. The government has certain rights in the invention.

BACKGROUND ART

Boron nitride (BN) is a well-documented, non-oxide ceramic whose synthesis can be achieved by many routes. The traditional routes are described in "Gmelin Handbuch der Anorganischen Chemie"; Springer-Verlag: West Berlin, 1988: 3rd Supplement, Vol. 3, and references therein. Many of the traditional routes to boron nitride are tedious, multi-stepped, costly, and do not provide routes for producing thin films of BN. One route to BN, and thin films thereof, involves chemical vapor deposition (CVD). Unfortunately, CVD techniques require special equipment and complex preparation.

Molecular precursors of BN are now being pursued as possible synthetic routes for thin films of BN. Recent interest in finding molecular precursors of BN by Narula et al. (Chem. Rev. 1990, 90, 73-91) has been spawned by the need for soluble and/or fusible pre-ceramic polymers in some advanced ceramic applications. An appropriate candidate for a BN molecular precursor must have certain characteristics and requirements including simple chemistry and non-elaborate techniques to obtain BN from the precursor.

Ideal molecular precursors to BN should already have the appropriate stoichiometry of boron and nitrogen, and require nothing more than thermal activation to achieve BN. Ammonia-borane, $H_3NBH_3$, would be the ideal candidate since it has the desired solubility in organic solvents and the appropriate ratio of boron and nitrogen is already present. The decomposition of $H_3NBH_3$ has been studied both in the solid state and solution. (Wang and Geanangel, Inorg. Chim. Acta. 1988, 148, 185–190; Komm et al., Inorg. Chem., 1983, 22, 1684–1686) However, one major drawback is the high volatility of $H_3NBH_3$ under mild thermal conditions. Ammonia-borane sublimes at temperatures near 112° C. and as a result the yield of BN is depleted. (Walker et al., Ceram. Bull., 1983, 62, 916-923). In addition, $H_3NBH_3$ decomposition produces volatile materials, i.e., $B_2H_6$ and $B_3H_3N_3H_3$, which lowers the yield of the BN desired by removing the BN from the source. In order to overcome this, a reactive site must be present in the pre-ceramic unit so that upon thermolysis the maximum yield of BN can be attained.

Sneddon (Chem. Mat., 1989, 1, pp. 443-448) has demonstrated a synthesis of BN from the reaction of commercially available dimethyl sulfide dibromoborane, $(CH_3)_2SBHBr_2$ and ammonia gas to form the unstable dibromo intermediate $H_3NBHBr_2$. This unstable intermediate can be used to create a solution for coating articles or substrates followed by exposure of the coating to ammonia gas and heat sufficient to cause the evolution of dimethyl sulfide, hydrogen, and hydrogen bromide to form BN. However, this method of Sneddon requires the use of ammonia gas, unlike the present invention, and relies upon the unstable dibromo intermediate $H_3NBHBr_2$.

Therefore a need exists for a $H_3NBH_3$-like material useful as a precursor for the thermal preparation of BN.

BRIEF DISCLOSURE OF INVENTION

The present invention relates to a novel method to produce boron nitride. More specifically, the invention relates to the novel preparation of ammonia-monochloroborane, $H_3NBH_2Cl$, and its subsequent use as a molecular precursor for BN. Thermolysis of $H_3NBH_2Cl$ leads to the formation of amorphous BN powder, which upon further heating produces turbostratic BN.

In describing the preferred embodiment of the invention specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION

It has been discovered that ammonia-borane, $H_3NBH_3$, reacts with anhydrous HCl to yield $H_3NBH_2Cl$.

It is well known that most molecules containing H-N-B-Cl are unstable and in fact, that such materials will spontaneously eliminate HCl. Thus, it would be expected that $H_3NBH_2Cl$ would be an unstable material which would spontaneously eliminate HCl. However, it has surprisingly been discovered that $H_3NBH_2Cl$ formed by reacting $H_3NBH_3$ and anhydrous HCl according to the present invention can be isolated as a solid material which is stable at ambient temperatures. This discovery is therefore a significant advance over the known art because it provides a room temperature stable, solvent soluble, molecular precursor to BN, yet is sufficiently unstable at elevated temperatures to begin decomposition to the formation of BN intermediate polymers.

It has also been surprisingly discovered that the monochloro derivative of $H_3NBH_3$ can be heated to about 800° C. to form amorphous BN according to the following formula

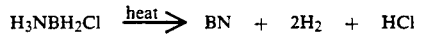

$$H_3NBH_2Cl \xrightarrow{heat} BN + 2H_2 + HCl$$

Experimental evidence indicates that the precursor $H_3NBH_2Cl$ cross-links by thermal activation to form a polymeric intermediate material. This polymeric material can be heated to form amorphous BN. Upon further heating to about 1100° C., the resulting white powder was characterized by X-ray powder diffraction, infrared spectroscopy, and elemental analysis as turbostratic boron nitride. By "turbostratic" boron nitride herein is meant a particular crystalline form known to those skilled in the art.

The superiority of $H_3NBH_2Cl$ over $H_3NBH_3$ as a BN precursor is that the ammonia-monochloroborane decomposes at low temperatures but does not sublime as readily as does $H_3NBH_3$. Furthermore, $H_3NBH_2Cl$ has relatively low volatility, is room temperature stable, and is soluble in certain organic solvents. $H_3NBH_2Cl$ also has the appropriate elemental ratio of boron and nitrogen present to be a BN precursor and therefore requires no other reagent such as ammonia to yield BN when thermolized or pyrolyzed. Thus unlike the prior art methods, which require $NH_3$ gas be present during the thermolysis, the present invention utilizing ammonia-monochloroborane, $H_3NBH_2Cl$, is very convenient.

Therefore one embodiment of the present invention is a method for the production of ammonia-monochloroborane, $H_3NBH_2Cl$, said method comprising the steps of reacting anhydrous hydrogen chloride with ammonia-borane, $H_3NBH_3$, to produce a chlorinated product. The preferred chlorinated product is the monochlorinated product, $H_3NBH_2Cl$. It is believed that the dichloro derivative of ammonia-borane, $H_3NBHCl_2$ is also useful in the present invention, but that the dichloro product would be less stable than the ammonia-monochloroborane of the present invention. The dichloro derivative, $H_3NBHCl_2$, would be prepared by reacting an additional mole of HCl with the ammonia-borane. Thus utilizing the procedure described herein for the preparation of $H_3NBH_2Cl$ with an excess of anhydrous hydrogen chloride, should produce $H_3NBHCl_2$.

Another embodiment of the present invention is a method for the production of boron nitride, said method comprising the steps of (a) reacting anhydrous hydrogen chloride with $H_3NBH_3$ to produce a chlorinated product, and (b) exposing the product of step (a) to heat sufficient to remove hydrogen and hydrogen chloride, whereby amorphous boron nitride is produced. In yet another embodiment of this method, a step (c) provides for the further heating to higher temperatures of the amorphous boron nitride to thereby produce turbostratic boron nitride.

It is believed that halogens other than chlorine can be used in an analogous manner. Thus it is believed that bromine would also work in the present invention to produce the ammonia-monobromoborane and ammonia-dibromoborane by utilizing anhydrous hydrogen bromide in place of anhydrous hydrogen chloride, although these brominated products are expected to be less stable than the preferred ammonia-monochloroborane. Such a method differs from that of Sneddon et al. by not requiring the use of a sulfur-containing compound or ammonia gas. It is also believed that the ammonia-bromoboranes would, according to the method of the present invention, produce upon heating amorphous BN.

In a preferred embodiment, the pressure above the product of step (b) is reduced to a pressure in the range of from slightly below one atmosphere down to less than one millimeter of mercury. A more preferred reduced pressure is in the range of several millimeters of Hg to several Torr. One purpose for the reduced pressure is to accommodate the hydrogen and hydrogen chloride vapors eliminated in the formation of BN. The formation of the BN is independent of the pressure but the reduced pressure is preferred herein to prevent the build up of pressure in the reactor due to the evolution of the gases. The pressure build up due to the gas evolution may cause the reactor vessel or seals to fail absent the reduction of pressure. For thin coating applications, it is preferred to use less rigorous vacuum conditions because reduction of pressure permits the sublimation of the reactant and intermediate products. In thin coating applications, this sublimation, and the irregular volatilization of any remaining solvent, reduces the uniformity of the coating deposited. For generating amorphous BN powders, further reduction of the pressure during the heating is acceptable even though some sublimation of the intermediate polymer will occur.

In another preferred embodiment, the heat of step (b) to produce the amorphous BN is in the range of from about 80 to 800 degrees Centigrade. The hydrogen gas is liberated at relatively low temperatures such as about 50 to 90 degrees Centigrade. At temperatures above about 80° C., both hydrogen and hydrogen chloride are evolved. The production of amorphous BN generally requires higher temperatures up to about 800 degrees Centigrade. The generation of the turbostratic crystalline form of the BN is achieved according to step (c) above by heating the amorphous BN up to about 1100 degrees Centigrade.

A more preferred embodiment exposes the $H_3NBH_2Cl$ to a temperature of from 80 to 90 degrees Centigrade and optionally a reduced pressure of from just below one atmosphere down to for example, 1 Torr. The reduced pressure is preferably achieved by means of vacuum pumping or otherwise evacuating the vessel containing the material. The reduction in pressure facilitates the continuous vapor phase removal of the reaction by-products, hydrogen gas and hydrogen chloride.

The elevated temperature can be achieved by any means or technique known in the art including immersion of a vessel containing the material in a sand bath, plasma, electric current, exposure of the material to a laser beam sufficient to create the necessary heat, and ovens or furnaces. The means of generating the elevated temperature is not critical to the present invention, provided that about 800 degrees Centigrade is achieved for the production of the amorphous BN and about 1100 degrees Centigrade is achieved for the production of the turbostratic crystalline form of BN. A preferred means of heating the $H_3NBH_2Cl$, and subsequently the amorphous BN, is by placing it in a furnace or oven. It is preferred but not required that the heating be performed slowly and evenly to thereby better achieve uniform and slow evolution of the hydrogen and hydrogen chloride to minimize disruption to the coating formation upon the substrate.

The invention further relates to a method of using $H_3NBH_2Cl$ prepared by the reaction of ammonia-borane ($H_3NBH_3$) and anhydrous hydrogen chloride, said method comprising heating the $H_3NBH_2Cl$ at a temperature and optionally a reduced pressure sufficient to cause the evolution therefrom of hydrogen and hydrogen chloride, whereby boron nitride is produced. For the production of amorphous BN powder, a solvent solution need not be utilized.

Also according to the present invention, $H_3NBH_2Cl$ has coating applications since the compound is soluble in organic solvents such as ethers. Hence, the simple procedure of dipping complexed-shaped materials into a concentrated solvent solution of $H_3NBH_2Cl$, followed by thermolysis, results in the desired BN coating on the complexed-shaped material.

Thus in another embodiment of the present invention, $H_3NBH_2Cl$ is mixed with, dissolved in or dispersed in a liquid or solvent and the mixture is applied to, for example, an object or substrate followed by thermolysis. The result is a BN coating on the object or substrate. It is particularly useful herein to mix $H_3NBH_2Cl$ with an ether solvent since $H_3NBH_2Cl$ is soluble in ether solvents. The solution of $H_3NBH_2Cl$ in an ether solvent can then be applied to the desired substrate by any known coating technique such as, but not limited to, spray coating, dip coating, spin casting, extrusion coating, brush on coating, transfer roll coating, and the like.

Preferred solvents useful in the present invention for dissolving $H_3NBH_2Cl$ include, among others known in the art, ethers such as diethyl ether and tetrahydrofuran. The solvent is preferably evaporated before the thermolysis begins.

Thus the present invention also relates to a method for the application to a substrate of a coating of BN, said method comprising the steps of: (a) applying a solution of $H_3NBH_2Cl$ dissolved in an ether solvent to a substrate to thereby coat the substrate, and (b) exposing the coating on the substrate to a temperature sufficient to cause the evolution from the coating of hydrogen and hydrogen chloride, whereby a boron nitride coating remains on the substrate.

The novel preparation of ammonia-monochloroborane, $H_3NBH_2Cl$, can be achieved according to the present invention by the introduction of dry HCl gas into a solution of $H_3NBH_3$ in diethyl ether. A rapid reaction occurs at room temperature and one molar equivalent of hydrogen is given off and $H_3NBH_2Cl$ is formed as an ether-soluble material. Upon evaporation of the diethyl ether, a colorless solid $H_3NBH_2Cl$ remains, which has no melting point but decomposes on heating. The thermal decomposition can be initiated at approximately 50 degrees Centigrade under static vacuum, and at 67–70 degrees in a sealed tube under autogenous pressure. Further thermal decomposition of the $H_3NBH_2Cl$ is achieved as described herein.

Ammonia-monochloroborane thus prepared slowly decomposes on standing even under inert atmosphere and reacts violently with water. It does not react with additional HCl at room temperature. $H_3NBH_2Cl$ is soluble in diethyl ether or tetrahydrofuran. However, evaporation of a THF solution of $H_3NBH_2Cl$ leaves a clear gummy material, which is not the case with diethyl ether.

Thermolysis of solid $H_3NBH_2Cl$ at temperatures near 60 degrees Centigrade results in the generation of hydrogen only and a colorless solid remains. Since only hydrogen gas was given off at this temperature, the initial reaction is thought to be the formation of a novel polymeric intermediate according to the equation:

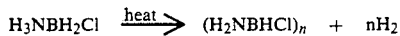

$$H_3NBH_2Cl \xrightarrow{heat} (H_2NBHCl)_n + nH_2$$

However, the generated hydrogen was more than expected purely on the basis of this equation. $H_3NBH_2Cl$ decomposed further at higher temperatures and leads to an apparently macromolecular intermediate species with the loss of hydrogen only. Hydrogen chloride is given off only at temperatures near about 80 degrees or higher, accompanied by additional loss of hydrogen, to thereby produce BN.

An important point of novelty of the present invention is the preparation of BN without the use of ammonia gas during the thermolysis step. Another important point of novelty is the preparation of $H_3NBH_2Cl$, and further, its subsequent thermolysis to form BN. Yet another novel aspect of the present invention is the synthesis of a novel polymeric chlorinated intermediate product, such as $(H_2NBHCl)_n$ from the thermolysis or partial thermolysis of $H_3NBH_2Cl$.

EXAMPLE 1: PREPARATION OF $H_3NBH_2Cl$

A 200 ml reaction vessel was charged with 0.434 grams (14 mmol) of $H_3NBH_3$ and a Teflon-coated stirring bar. The flask was evacuated and 20 ml of dry diethyl ether was condensed in at −196 degrees Centigrade. Then 14 mmol of anhydrous HCl was condensed in at the same temperature. The stirred mixture was then allowed to warm to ambient temperature and hydrogen gas evolved. This evolution ceased after about five minutes and a 98% yield of $H_3NBH_2Cl$ was obtained (as based on the amount of hydrogen gas measured). Volatile material was removed under dynamic vacuum at ambient temperature to leave a colorless, flaky solid. The compound has no melting point but decomposes on heating. The thermal decomposition begins at 50–54 degrees Centigrade under static vacuum, and at 67–70 degrees Centigrade in a sealed tube under atmospheric pressure.

EXAMPLE 2: PREPARATION OF $H_3NBH_2Cl$

A sample, 0.342 g (11.0 mmol) of $H_3NBH_3$ was placed in a 100-ml flask and evacuated. Approximately 20 ml of dry diethyl ether was condensed into the flask at −78 degrees Centigrade. The $H_3NBH_3$ dissolved completely and then the solution was cooled to −196 degrees Centigrade. A quantity, 11.0 mmol, of dry HCl was condensed into the flask. The mixture was allowed to reach room temperature and was shaken by hand as rapid gas evolution occurred. The gas evolution ceased after approximately five minutes and the flask was cooled back to −196 degrees Centigrade. Eleven mmol of hydrogen gas were measured to be evolved. The flask was again allowed to warm to room temperature and all volatiles were removed under dynamic vacuum. A colorless solid of $H_3NBH_2Cl$ remained.

EXAMPLE 3: THERMOLYSIS OF $H_3NBH_2Cl$ TO PRODUCE BN

The flask containing colorless solid $H_3NBH_2Cl$ produced by the method of Example 2 above was placed in a sand bath and the solid was heated to a bath temperature of 58 degrees Centigrade. During this thermolysis, a −78 degrees Centigrade trap and a −196 degrees Centigrade trap were used to condense any volatile materials evolving under the static vacuum. After 6 hours, 17 mmol of hydrogen gas had evolved but no formation of HCl was observed. The remaining product of the thermolysis was collected and underwent further decomposition near 80 degrees Centigrade in a sealed capillary tube.

A sample of $H_3NBH_2Cl$ (15 mmol) was placed in a furnace and heated to about 88 degrees Centigrade for 18 hours. Hydrogen gas (24 mmol) was the only volatile material observed. Further heating at 120 degrees Centigrade for 18 hours produced HCl gas (5.6 mmol) as well as additional hydrogen (3.5 mmol). The temperature was then raised further to 250 degrees Centigrade for an additional 8 hours where only HCl gas (4.7 mmol) was observed and liberation of hydrogen gas had ceased. The infrared spectrum of the material still exhibited a strong N-H stretch near 3400 cm$^{-1}$, a strong B-H stretch near 2500 cm$^{-1}$, and a B-Cl stretch near 800 cm$^{-1}$. However, after heating to about 800 degrees Centigrade for 6 hours, amorphous BN resulted. Further heating for at least 8 hours to about 1100 degrees Centigrade in the furnace produced a conversion of the amorphous BN to the crystalline turbostratic form, as evidenced by the X-ray powder pattern of the insoluble colorless powdery product, and the disappearance of the IR absorption bands.

While certain preferred embodiments of the present invention have been disclosed in detail, it is to be understood that various modifications may be adopted without departing from the spirit of the invention or scope of the following claims.

We claim:

1. A method for the production of amorphous boron nitride said method comprising the steps of:
   (a) reacting anhydrous hydrogen chloride with $H_3NBH_3$ in an organic solvent to produce a room-temperature stable, organic solvent-soluble, chlorinated product selected from the group consisting of $H_3NBH_2Cl$ and $H_3NBHCl_2$, and
   (b) heating the product of step (a) to a temperature of from about 80 to about 800 degrees centrigrade to remove hydrogen and hydrogen chloride, whereby amorphous boron nitride is produced.

2. The method of claim 1 further comprising a reduction in the vapor pressure during the heating of step (b) wherein the pressure is in the range of from just below one atmosphere to about 1 millimeter of mercury.

3. The method of claim 1 wherein the said chlorinated products is mixed prior to heating with an ether solvent selected from the group consisting of diethyl ether and tetrahydrofuran.

4. A method for the production of turbostratic boron nitride said method comprising the steps of:
   (a) reacting anhydrous hydrogen chloride with $H_3NBH_3$ in an organic solvent to produce a room-temperature stable, organic solvent-soluble, chlorinated product selected from the group consisting of $H_3NBH_2Cl$ and $H_3NBHCl_2$,
   (b) heating the product of step (a) to a temperature of from about 80 to about 800 degrees Centigrade to remove hydrogen and hydrogen chloride, whereby amorphous boron nitride is produced, and hydrogen and hydrogen chloride, whereby turbostratic boron nitride is produced.

* * * * *

UNITED STATES PATENT AND TRADEMARK OFFICE
CERTIFICATE OF CORRECTION

PATENT NO. : 5,169,613
DATED : December 8, 1992
INVENTOR(S) : Sheldon G. Shore et al.

It is certified that error appears in the above-identified patent and that said Letters Patent is hereby corrected as shown below:

In column 8, line 7, claim 4 should read as follows:

4. A method for the production of turbostratic boron nitride said method comprising the steps of:
 (a) reacting anhydrous hydrogen chloride with $H_3NBH_3$ in an organic solvent to produce a room-temperature stable, organic solvent-soluble, chlorinated product selected from the group consisting of $H_3NBH_2Cl$ and $H_3NBHCl_2$,
 (b) heating the product of step (a) to a temperature of from about 80 to about 800 degrees Centigrade to remove hydrogen and hydrogen chloride, whereby amorphous boron nitride is produced, and
 (c) heating the product of step (b) to a temperature of from about 800 to about 1100 degrees Centigrade to remove hydrogen and hydrogen chloride, whereby turbostratic boron nitride is produced.

Signed and Sealed this

Nineteenth Day of October, 1993

Attest:

BRUCE LEHMAN

*Attesting Officer*   *Commissioner of Patents and Trademarks*